(12) United States Patent
Johnson et al.

(10) Patent No.: US 10,884,252 B2
(45) Date of Patent: Jan. 5, 2021

(54) COMPACT TRANSFORM OPTICS FOR SPECTRAL BEAM COMBINING

(71) Applicant: RAYTHEON COMPANY, Waltham, MA (US)

(72) Inventors: Tim P. Johnson, Torrance, CA (US); Kyle Heideman, Hawthorne, CA (US); Todd O. Clatterbuck, Playa Vista, CA (US); John Edgecumbe, Redondo Beach, CA (US); Fabio Di Teodoro, Hacienda Heights, CA (US); Maurice J. Halmos, Encino, CA (US)

(73) Assignee: RAYTHEON COMPANY, Waltham, MA (US)

( * ) Notice: Subject to any disclaimer, the term of this patent is extended or adjusted under 35 U.S.C. 154(b) by 85 days.

(21) Appl. No.: 16/232,184

(22) Filed: Dec. 26, 2018

(65) Prior Publication Data

US 2020/0209635 A1 Jul. 2, 2020

(51) Int. Cl.
*G02B 27/10* (2006.01)
*G02B 17/06* (2006.01)
*G02B 27/09* (2006.01)

(52) U.S. Cl.
CPC ..... *G02B 27/1006* (2013.01); *G02B 17/0631* (2013.01); *G02B 27/0927* (2013.01); *G02B 27/0966* (2013.01)

(58) Field of Classification Search
CPC ............ G02B 27/1006; G02B 17/0631; G02B 27/0927; G02B 27/0966
See application file for complete search history.

(56) References Cited

U.S. PATENT DOCUMENTS 3,460,886 A 8/1969 Lower et al.
4,265,510 A 5/1981 Cook
(Continued)

FOREIGN PATENT DOCUMENTS

EP 3246744 A1 11/2017
JP H10333068 A 12/1998

OTHER PUBLICATIONS

Augst et al. "Beam combining of ytterbium fiber amplifiers (Invited)", Journal of the Optical Society of America (2007) vol. 24, No. 8, pp. 1707-1715.
(Continued)

*Primary Examiner* — Wen Huang
(74) *Attorney, Agent, or Firm* — Lando & Anastasi, LLP

(57) ABSTRACT

Spectral beam combining systems including a multi-element transform optic. In certain examples the multi-element transform optic includes a first cylindrical optical element having positive optical power in a first axis, a second optical element having negative optical power in the first axis, and a third toroidal optical element having positive optical power in the first axis and either positive or negative optical power in a second axis that is orthogonal to the first axis. The first and third optical elements are positioned on opposite sides of the second optical element and equidistant from the second optical element. The multi-element transform optic has an optical path length extending between a front focal plane and a back focal plane that is shorter than an effective focal length of the multi-element transform optic.

19 Claims, 7 Drawing Sheets

(56) References Cited

U.S. PATENT DOCUMENTS

| | | | |
|---|---|---|---|
| 4,281,889 A * | 8/1981 | Noguchi | G02B 26/12 359/216.1 |
| 7,199,924 B1 | 4/2007 | Brown et al. | |
| 8,277,060 B2 | 10/2012 | Cook | |
| 8,714,760 B2 | 5/2014 | Cook | |
| 8,903,209 B2 | 12/2014 | Cheung et al. | |
| 2006/0228072 A1 | 10/2006 | Davis et al. | |
| 2010/0110556 A1 | 5/2010 | Chann et al. | |
| 2011/0216792 A1 | 9/2011 | Chann et al. | |
| 2013/0201560 A1 | 8/2013 | Dueck | |

OTHER PUBLICATIONS

Cheung et al. "High density spectral beam combination with spatial chirp precompensation", Optics Express (2011) vol. 19, No. 21, pp. 20984-20990.

Palmer et al. "Diffraction Grating Handbook", 6th edition. Newport Corporation (2005). Rochester, NY.

Liu et al. "Spectral beam combining of high power fiber lasers", Proceedings of SPIE (2004) vol. 5335, pp. 81-88.

Honea et al. "Spectrally Beam Combined Fiber Lasers for High Power, Efficiency and Brightness", Proceedings of SPIE (2013) vol. 8601, pp. 860115-1-860115-5.

Röser et al. "Spectral combining of fiber lasers", Proceedings of SPIE (2006) vol. 6102, pp. 61020T-1-61020T-6.

Britten, J.A. "Diffraction Gratings for High-Intensity Laser Applications", Lawrence Livermore National Laboratory (2008).

Perry, M. "Multilayer Dielectic Gratings: Increasing the Power of Light", Science & Technology Review (1995), pp. 24-33.

Sanchez-Rubio et al. "Wavelength Beam Combining for Power and Brightness Scaling of Laser Systems", Lincoln Laboratory Journal (2014) vol. 20, No. 2, pp. 52-66.

Augst et al. "Coherent and Spectral Beam Combining of Fiber Lasers", Proceedings of SPIE (2012) vol. 8237, pp. 323704-1-823704-10.

Loftus et al. "Spectrally Beam-Combined Fiber Lasers for High-Average-Power Applications", IEEE Journal of Selected Topics in Quantum Electronics (2007) vol. 13, No. 3, pp. 487-497.

Zeringue et al. "A theoretical study of transient stimulated Brillouin scattering in optical fibers seeded with phase-modulated light", Optics Express (2012) vol. 20, No. 19, pp. 21196-21213.

Madasamy et al. "Dual-Grating Spectral Beam Combination of High-Power Fiber Lasers", IEEE Journal of Selected Topics in Quantum Electronics (2009) vol. 15, No. 2, pp. 337-343.

Madasamy et al. "Comparison of spectral beam combining approaches for high power fiber laser systems", Proceedings of SPIE (2008) vol. 6952, pp. 695207-1-695207-10.

Flores et al. "Pseudo-random binary sequence phase modulation for narrow linewidth, kilowatt, monolithic fiber amplifiers", Optics Express (2014) vol. 22, No. 15, pp. 17735-17744.

Anderson et al. "Filtered pseudo random modulated fiber amplifier with enhanced coherence and nonlinear suppression", Optics Express (2017) vol. 25, No. 15, pp. 17671-17682.

Anderson et al. "Comparison of phase modulation schemes for coherently combined fiber amplifiers", Optics Express (2015) vol. 23, No. 21, pp. 27046-27060.

Augst et al. "Wavelength beam combining of ytterbium fiber lasers", Optics Letters (2003) vol. 28, No. 5, pp. 331-333.

Fan, T.Y. "Laser Beam Combining for High-Power, High-Radiance Sources", IEEE Journal of Selected Topics in Quantum Electronics (2005) vol. 11, No. 3, pp. 567-577.

Honea et al. "Advances in Fiber Laser Spectral Beam Combining for Power Scaling", Proceedings of SPIE (2015) vol. 9730, pp. 97300Y-1-97300Y-9.

Invitation to Pay Additional Fees in International Application No. PCT/US2019/063018 dated May 13, 2020.

International Search Report and Written Opinion in International Patent Application No. PCT/US2019/063018 dated Oct. 2, 2020.

Bochove, E J., "Theory of Spectral Beam Combining of Fiber Lasers," IEEE Journal of Quantum Electronics (2002) vol. 38, No. 5, pp. 432-445.

* cited by examiner

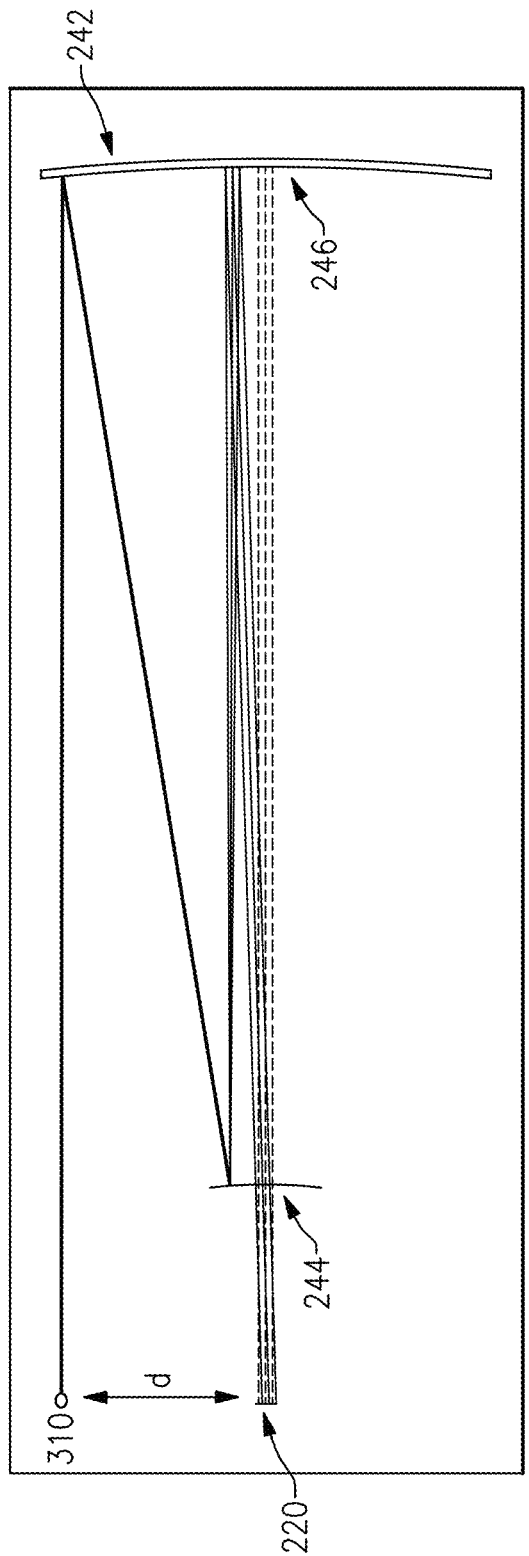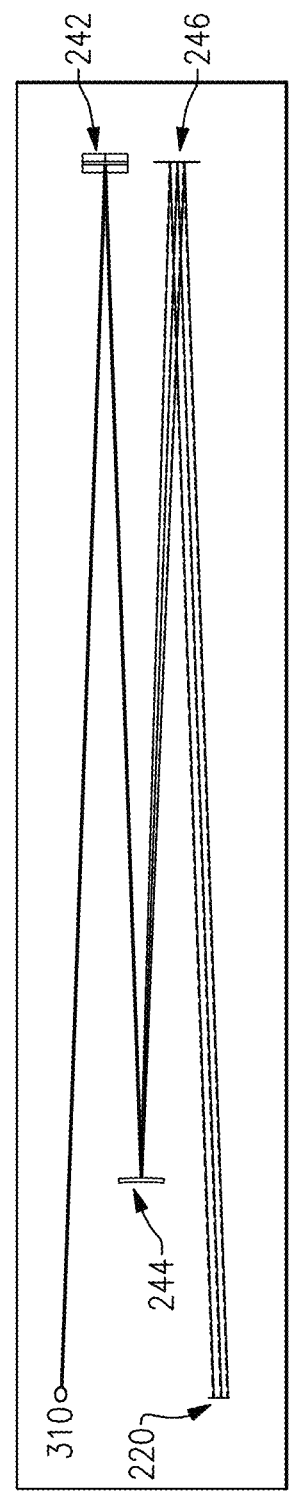

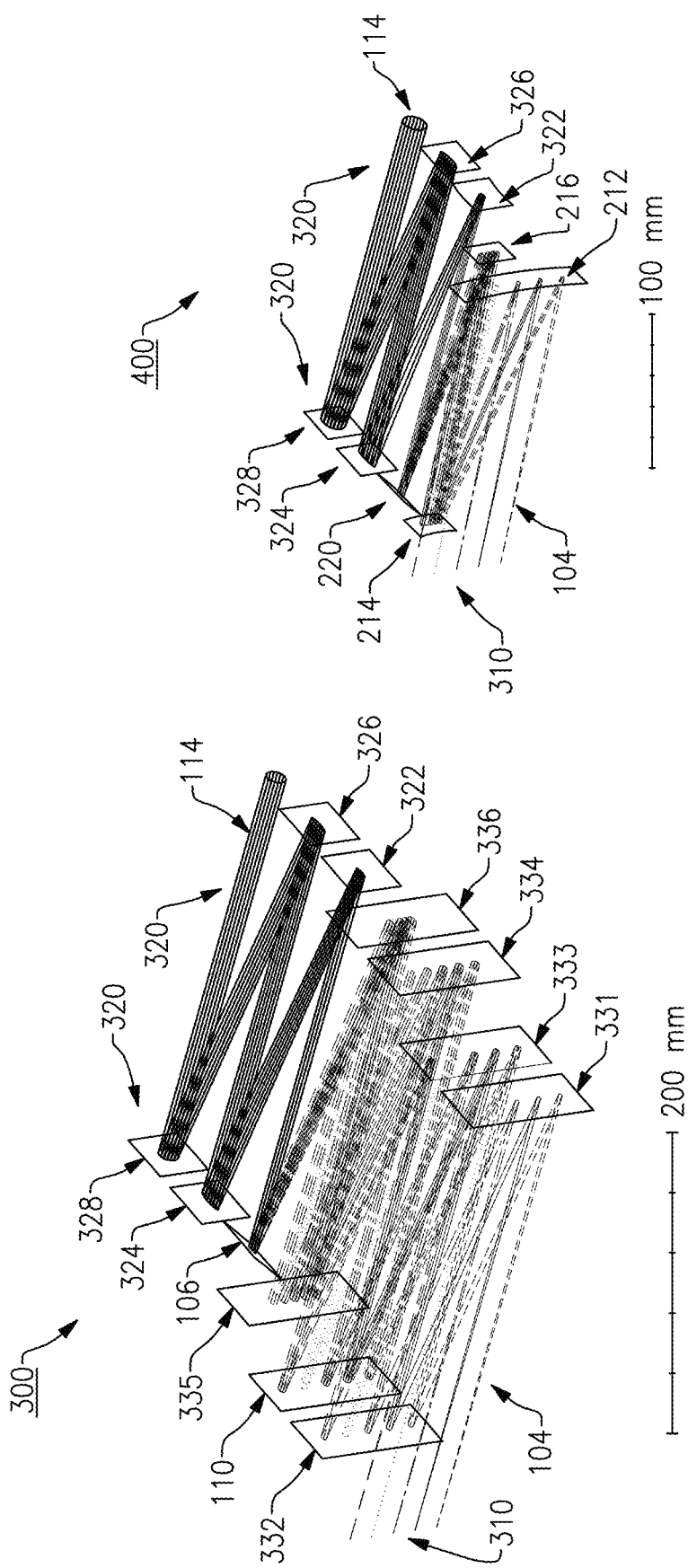

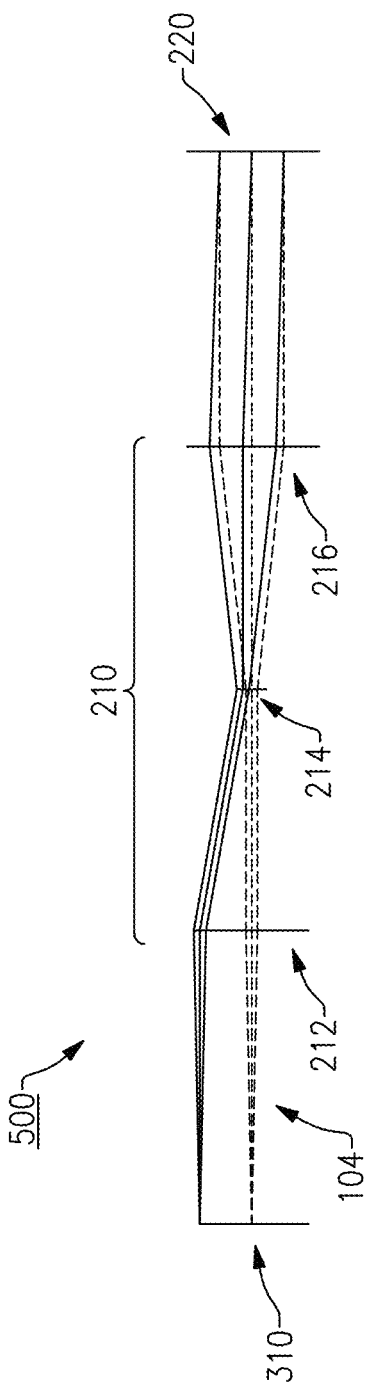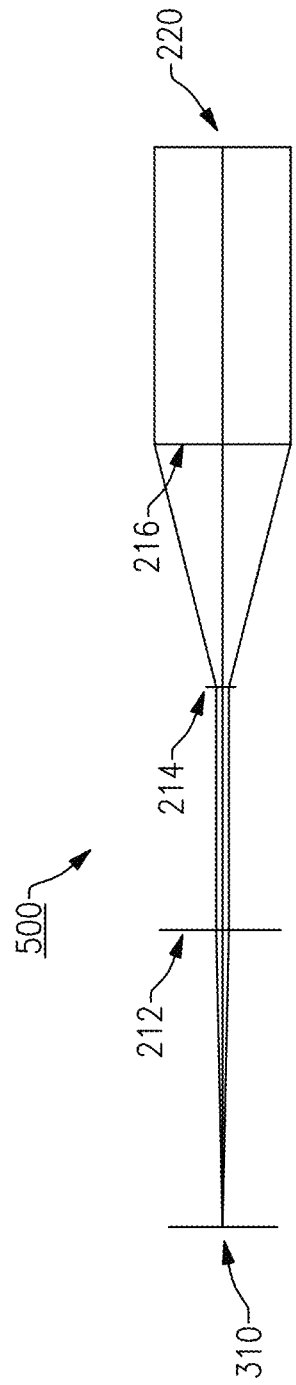
FIG.6A
FIG.6B

COMPACT TRANSFORM OPTICS FOR SPECTRAL BEAM COMBINING

BACKGROUND

Spectral beam combining involves combining a plurality of laser beams with differing wavelengths into a single beam using a spectrally dispersive element. Spectral beam combining is used in the field of laser technologies to obtain more powerful lasers while maintaining laser beam quality. The quality of a laser beam is typically measured by how tightly a laser beam can be focused on a target. A diffraction limited beam is a beam that is of the best quality and thus may be tightly focused on a target. Spectral beam combining can be used to produce a more powerful diffraction limited laser beam by combining multiple individual diffraction limited laser beams into a single output beam. Spectral beam combining may also be used in fiber optic wavelength division multiplexing and demultiplexing systems. In such systems, multiple wavelength signals are transmitted through a single fiber, and at the transmitter end, receiver end, and any intermediate "add/drop" nodes, wavelengths need to be combined (multiplexed) and/or separated (demultiplexed).

Conventional spectral beam combining systems use a single transform optic having a focal length selected based on parameters of the dispersive element (typically a diffraction grating) and the physical spacing between the fibers that produce the individual beams being combined. FIGS. 1A and 1B are diagrams showing an example of a conventional spectral beam combining system. FIG. 1A shows a side view (dispersion axis; x-axis), and FIG. 1B shows a top view (non-dispersion axis; y-axis). The system includes a plurality of fibers (not shown) positioned at a front focal plane 102 that produce a corresponding plurality of individual beams 104. A diffraction grating 106 is positioned at a back focal plane 108. The transform optic 110 is centered along the dispersion axis at an intermediate plane 112. The system combines the plurality of individual beams 104 to produce a combined output beam 114. The transform optical 110 can be a lens or a mirror. The transform optic 110 is typically cylindrical, not spherical (i.e., optically powered only in the x-axis) because the system only needs to focus the beams 104 in the dispersion axis, which corresponds to the fiber axis. As a result, the output beam 114 is cylindrical, as shown in FIGS. 1A and 1B. The focal length (f) of the transform optic 110 is selected based on the grating equation:

$$f = f' = \frac{\Delta y \, d \cos\alpha}{\Delta \lambda} \quad (1)$$

In Equation (1), d is grating groove spacing, $\Delta y$ is the fiber spacing, $\alpha$ is the grating angle, and $\Delta \lambda$ is the wavelength spacing between the fibers. The system is used in a 1f:1f configuration (i.e., f=f') so that the beams 104 from the plurality of fibers all come together at the grating 106. This is equivalent to a telecentric system with the aperture stop at the lens (transform optic) focus.

SUMMARY OF INVENTION

Aspects and embodiments are directed to spectral beam combining systems that use a multi-element transform optic to achieve greater compactness while maintain excellent optical performance.

According to one embodiment, a multi-element transform optic for a spectral beam combining system comprises a first optical element, the first optical element being a cylindrical optical element having positive optical power in a first axis, a second optical element, the second optical element having negative optical power in the first axis, and a third optical element, the third optical element being a toroid having positive optical power in the first axis and either positive or negative optical power in a second axis that is orthogonal to the first axis, the first and third optical elements being positioned on opposite sides of the second optical element and equidistant from the second optical element. The multi-element transform optic has an optical path length extending between a front focal plane and a back focal plane that is shorter than an effective focal length of the multi-element transform optic, the first optical element being positioned between the front focal plane and the second optical element, and the third optical element being positioned between the second optical element and the back focal plane.

In one example, the second optical element is a cylindrical optical element, and the third optical element has negative optical power in the second axis.

In another example, the second optical element is a toroid having negative optical power in the second axis, and the third optical element has positive optical power in the second axis.

In certain examples, the first, second, and third optical elements are mirrors. In one example, the first optical element and the third optical element have a same radius of curvature. In other examples, the first, second, and third optical elements are lenses.

In one example, a first distance between the front focal plane and the first optical element is equal to a second distance between the third optical element and the back focal plane. In another example, a third distance between the first optical element and the second optical element is equal to a fourth distance between the second optical element and the third optical element.

According to another embodiment, a spectral beam combining system comprises a multi-element transform optic including a first optical element having positive optical power in a first axis, a second optical element having negative optical power in the first axis, and a third optical element having positive optical power in the first axis, the second optical element being positioned between the first and third optical elements along the first axis, a diffraction grating positioned at a back focal plane of the multi-element transform optic, and a plurality of optical fibers positioned at a front focal plane of the multi-element transform optic and configured to generate a corresponding plurality of individual optical beams, the multi-element transform optic and the diffraction grating in combination being configured to spectrally overlap the plurality of individual optical beams to form a combined output beam, the first axis corresponding to a dispersion axis of the plurality of optical fibers. An effective focal length of the multi-element transform optic is longer than an optical path length of the multi-element transform optic that extends from the front focal plane to the back focal plane.

In one example, the plurality of optical fibers are fiber lasers.

In certain examples, the first, second, and third optical elements are mirrors. In one example, the first and third optical elements have a same radius of curvature. In other examples, the first, second, and third optical elements are lenses.

In one example, the first and second optical elements are cylindrical optical elements, and the third optical element is a toroid having negative optical power in a second axis that is orthogonal to the first axis, the second axis corresponding to a non-dispersion axis of the plurality of optical fibers.

In another example, the first optical element is a cylindrical optical element, the second optical element is toroid having negative optical power in a second axis that is orthogonal to the first axis, and the third optical element is a toroid having positive optical power in the second axis, the second axis corresponding to a non-dispersion axis of the plurality of optical fibers.

In one example, the second optical element is equidistant from the front and back focal planes along the first axis. In another example, a first distance between the first optical element and the front focal plane is equal to a second distance between the third optical element and the back focal plane.

The spectral beam combining system may further comprise aft optics configured to receive the combined output beam from the diffraction grating. In one example, the combined output beam received from the diffraction grating has an elliptical beam profile, and the aft optics are configured to reshape the elliptical beam profile into a circular beam profile.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 4A is a side view (dispersion axis) of a partial ray trace of one example of the spectral beam combining system of FIG. 3B including a three-mirror transform optic according to aspects of the present invention;

FIG. 4B is a top view (non-dispersion axis) of the spectral beam combining system of FIG. 4A.

FIG. 5A is a partial ray trace of an example of a spectral beam combining system using a conventional single-element transform optic;

FIG. 5B is a partial ray trace of one example of a spectral beam combining system using a multi-element transform optic according to aspects of the present invention;

FIG. 6A is a side view (dispersion axis) of a partial ray trace of one example of a spectral beam combining system including a multi-element transform optic according to aspects of the present invention; and FIG. 6B is a top view (non-dispersion axis) of the spectral beam combining system of FIG. 6A.

DETAILED DESCRIPTION

Aspects and embodiments are directed to spectral beam combining systems and methods that use a multi-optic design, including positive (P) and negative (N) focal length (or optical power) optics for the transform optic, instead of a single optic as in conventional designs. As discussed above, various parameters of a spectral beam combining system are selected in accordance with Equation (1). The variables in Equation (1) are subject to various constraints, which limit the flexibility of the optical design of the system. For example, the grating groove spacing (d) may be constrained to certain sizes by supplier limitations. The wavelength spacing ($\Delta\lambda$) generally must be small based on limitations associated with available fiber designs and performance capabilities. In addition, the fiber spacing ($\Delta y$) cannot be made too small because moderate spacing is typically needed to allow for system alignment and due to limitations on how closely the fibers can be placed together. As a result, for conventional spectral beam combining systems that use a single transform optic 110, typical parameters generally result in a long focal length (f), for example, in a range of about 1-2 meters. The overall physical size of conventional spectral beam combining systems thus tends to be large, which is not desirable in many applications.

Aspects and embodiments provide a set of optics that creates a spatial Fourier transform between two planes in much more compact size than conventional designs. This set of optics can be used to replace the single transform optic conventionally used in spectral beam combining systems, thus providing the ability to produce a spectral beam combining system having an optical assembly that is much more compact than conventional systems. By reducing the size of the optical assembly, which in and of itself may be advantageous, the weight and cost of the system may also be reduced. In addition, the thermal sensitivity of the system can be reduced, both as a result of the smaller physical size and because the use of multiple optics for the transform optic instead of only a single optic provides more degrees of freedom to correct for thermal effects. Embodiments of the set of optics disclosed herein may be applied to all forms of spectral beam combining that use transform optics, regardless of number of channels, number of gratings, and types of laser (e.g., fiber, diode, etc.).

Figure 2:
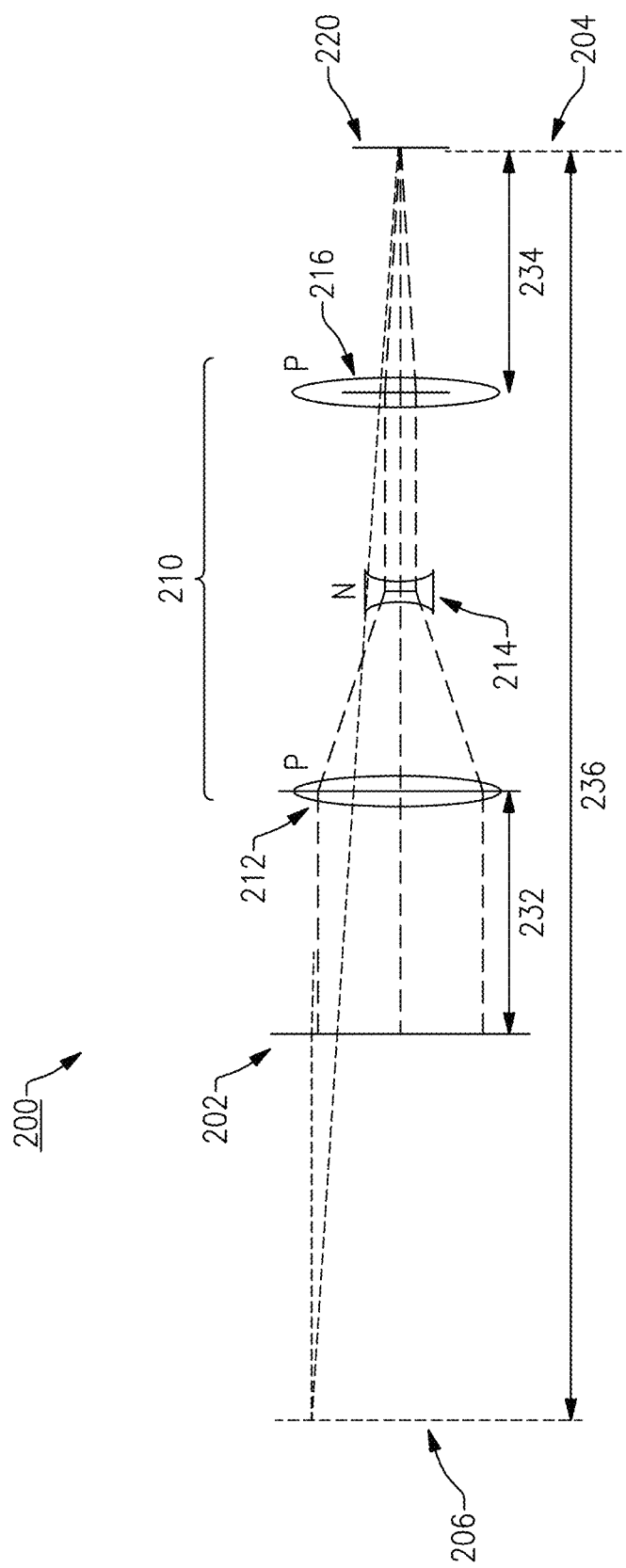
FIG. 2 is a diagram of one example of a spectral beam combining system according to aspects of the present invention.

Referring to FIG. 2 there is illustrated a diagram of one example of a spectral beam combining system 200 including a multi-element transform optic 210 according to certain embodiments. Similarly, as discussed above, a plurality of fibers (not shown) are located at a front focal plane 202, and a dispersive element, typically a diffraction grating 220, is located at a back focal plane 204. The transform optic 210 is located between the front and back focal planes 202, 204. The number, arrangement, and configuration (e.g., shape, optical power, etc.) of the optical elements 212, 214, 216 of the transform optic 210 are selected to achieve certain design goals for the spectral beam combining system 200, including compact physical size.

To achieve the goal of compact physical size, the front focal distance 232 (i.e., the distance between the front focal plane 202 and the closest optical element of the transform optic 210, in this case, first optical element 212) should be short, as should be the back focal distance 234 (i.e., the distance between the back focal plane 204 and the closest optical element of the transform optic 210, in this case, third optical element 216). In addition, the transform optic 210 should have symmetry in the x-axis to reduce the total distance between the front focal plane 202 and the back focal plane 204. It can be shown mathematically that any two-element transform optic, whether having a positive-negative, negative-positive, or positive-positive optical power configuration, will result in a longer distance between the front and back focal planes 202, 204 than a single-element transform optic. Accordingly, the transform optic 210 includes three optical elements, namely the first optical element 212, a second optical element 214, and the third optical element 216. In the illustrated example, the first, second, and third optical elements 212, 214, 216, are lenses; however, in other examples any or all of the first, second, and third optical elements 212, 214, 216 can be mirrors.

As discussed above, Equation (1) influences several parameters in the design of a spectral beam combining system and in the design of the transform optic 210. In particular, transform optic 210 may need to have a relatively long effective focal length 236 (distance between a principle plane 206 and the back focal plane 204) due to limitations in the grating density (d) and the fiber spacing (Δy). The effective focal length 236 is linearly proportional to the fiber spacing. As discussed above, there are practical limits to how small the fiber spacing can be because the fiber spacing is related to system adjustability—in order to be able to adjust the fibers, for example, to achieve alignment within a desired accuracy/tolerance, a certain amount of spacing is needed between the fibers. This requirement sets a lower limit for the effective focal length. Advantageously, with a multi-element transform optic 210, the optical path length (distance between the front focal plane 202 and the back focal plane 204) can be made small to achieve physical compactness, while still having a long effective focal length 236. In particular, according to certain embodiments, the optical elements 212, 214, and 216 can be designed and arranged to achieve both a long effective focal length 236 and short front and back focal distances 232, 234. In one example, the transform optic 210 is configured with a telephoto arrangement (PNP) in the dispersion axis, where the first optical element 212 has positive optical power (P), the second optical element 214 has negative optical power (N), and the third optical element 216 has positive optical power (P). This arrangement can achieve a long effective focal length 236 with a short back focal distance 234, and a short front focal distance 232 is achieved through symmetry. It should be noted that the opposite arrangement (NPN), where the first optical element 212 has negative optical power (N), the second optical element 214 has positive optical power (P), and the third optical element 216 has negative optical power (N), is an inverse telephoto arrangement that provides a short effective focal length 236 and therefore may be an undesirable configuration for the transform optic 210. In certain examples, the first, second, and third optical elements 212, 214, 216 cylindrical lenses that are optically powered only in the dispersion axis. In certain examples the optical elements 212, 214, and 216 are also configured to provide collimated optical beams between the first optical element 212 and the third optical element 216.

Figure 3A:
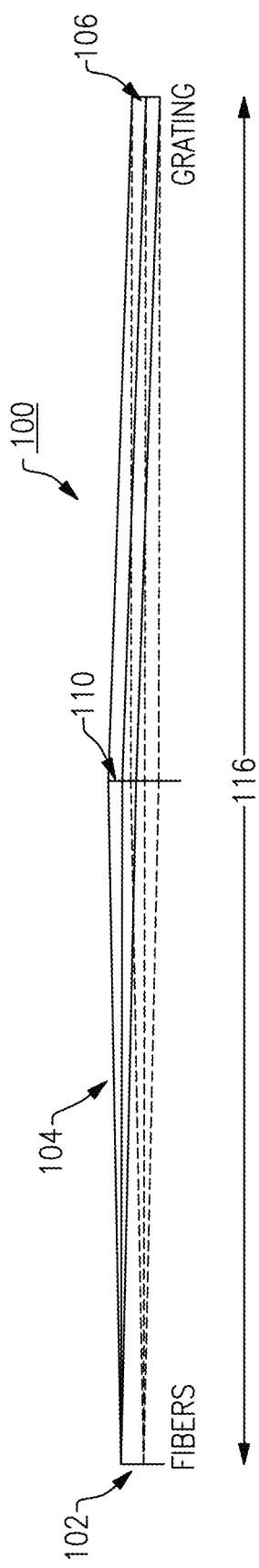
FIG. 3A is a diagram of one example of a conventional spectral beam combining system.
Figure 3B:
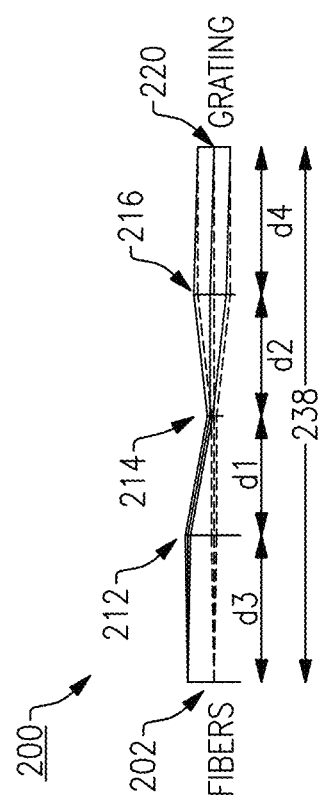
FIG. 3B is a diagram, drawn to the same scale as FIG. 3A, of one example of a spectral beam combining system including a multi-element transform optic according to aspects of the present invention.

FIGS. 3A and 3B are simplified side-view (dispersion axis) ray traces of an example of a conventional spectral beam combining system 100 with a single-element transform optic 110 (FIG. 3A) and an example of the spectral beam combining system 200 disclosed herein having a three-element transform optic made up of the first, second, and third optical elements 212, 214, 216 (FIG. 3B). Both systems 100, 200 have a symmetric 1f:1f configuration. FIGS. 3A and 3B are drawn to the same relative scale to illustrate the difference in physical length between the two systems.

FIGS. 4A and 4B are partial ray traces showing an example of an implementation of the system 200 shown in FIG. 3B. FIG. 4A shows a side view (dispersion axis) and FIG. 4B shows a top view (non-dispersion axis). In this example, the first optical element 212 is a positive-powered mirror 242, the second optical element 214 is a negative-powered mirror 244, and the third optical element 216 is a positive-powered mirror 246, such that the transform optic 210 has the PNP configuration discussed above. As can be seen by comparing FIGS. 3A and 3B, the spectral beam combining system 200 using the three-element transform optic (212. 214, 216) has a much more compact physical size. In one example, the conventional system 100 has an optical path length 116 of 2460 millimeters (mm), whereas the system 200, implemented as shown in FIGS. 4A and 4B, has an optical path length 238 (from fibers 310 to the diffraction grating 220) of only 800 mm. Both systems 100, 200 have an effective focal length of 1230 mm. In this example, in the side view of FIG. 4A, the distance d between the fibers 310 and the diffraction grating 220 is 36 mm. Further, in this example, the first positive-powered mirror 242 has a 440 mm radius of curvature, the second negative-powered mirror 244 has an 80 mm radius of curvature, and the third positive-powered mirror 246 has a 440 mm radius of curvature. The design is symmetrical. Thus, distance d1 between the first mirror 242 and the second mirror 244 is the same as the distance d2 between the second mirror 244 and the third mirror 246. In the example of FIGS. 4A and 4B, d1=d2=180 mm. Similarly, the distance d3 between the fibers 310 and the first mirror 242 is the same as the distance d4 between the third mirror 246 and the grating 220. In the illustrated example, d3=d4=220 mm.

Since the multi-element transform optic of FIG. 3B has the same effective focal length as the single-element transform optic 110, it also has the same angular error sensitivity. For example, if a fiber shifts laterally by 1.23 μm, this shift would cause an angular error of 1.23 μm divided by 1230 mm, thus 1 μrad, at the grating in either system. However, because the optical path length 238 of the multi-element transform optic of FIG. 3B is shorter, it has less bench thermal sensitivity. Thermally induced changes in the optical path length affect beam overlay at grating and angle of incidence at the grating, and thus beam quality. For example, if an Aluminum bench associated with the conventional single-element transform optic 110 warms by 1 degree Celsius (° C.), the optical path length increases by 23e–6*2460 mmm*1° C.=57 μm. In the system 200 with the more compact multi-element transform optic, the same 1° C.

increase in the Aluminum bench causes an optical path length increase of only 23e−6*800 mm*1° C.=18 μm. Thus, error introduced by the change in optical path length is significantly decreased since the change is much smaller.

In examples in which the first, second, and third mirrors 242, 244, 246 are spherical, there may be some spherical aberration in designs where the fibers 310 have larger numerical apertures; however, in many instances the system 200 can be designed with a small numerical aperture. In addition, the system 200 may exhibit minimal field aberrations due to nature of design. For example, spherical aberration is low because fibers with low numerical aperture can be used, and spherical aberration can be further reduced by using conic mirrors. Low distortion and coma can be achieved through symmetry (i.e., the radius of curvature of the first mirror 242 is equal to the radius of curvature of the third mirror 246, as noted above). In addition, the system 200 may exhibit low astigmatism due to the confocal configuration. Low field curvature is achieved through the PNP balanced optical power configuration.

FIGS. 5A and 5B show comparative examples of an optical layout of a spectral beam combining system including aft optics that are used to relay and optionally condition the spectrally combined output beam. FIG. 5A shows an example of a conventional spectral beam combining system 300 that uses the single transform optic 110, and FIG. 5B shows an example of a spectral beam combining system 400 including an embodiment of the multi-element transform optic 210 disclosed herein. FIGS. 5A and 5B are drawn to the same relative scale to illustrate the compact nature of the spectral beam combining system 400.

Figure 1A:
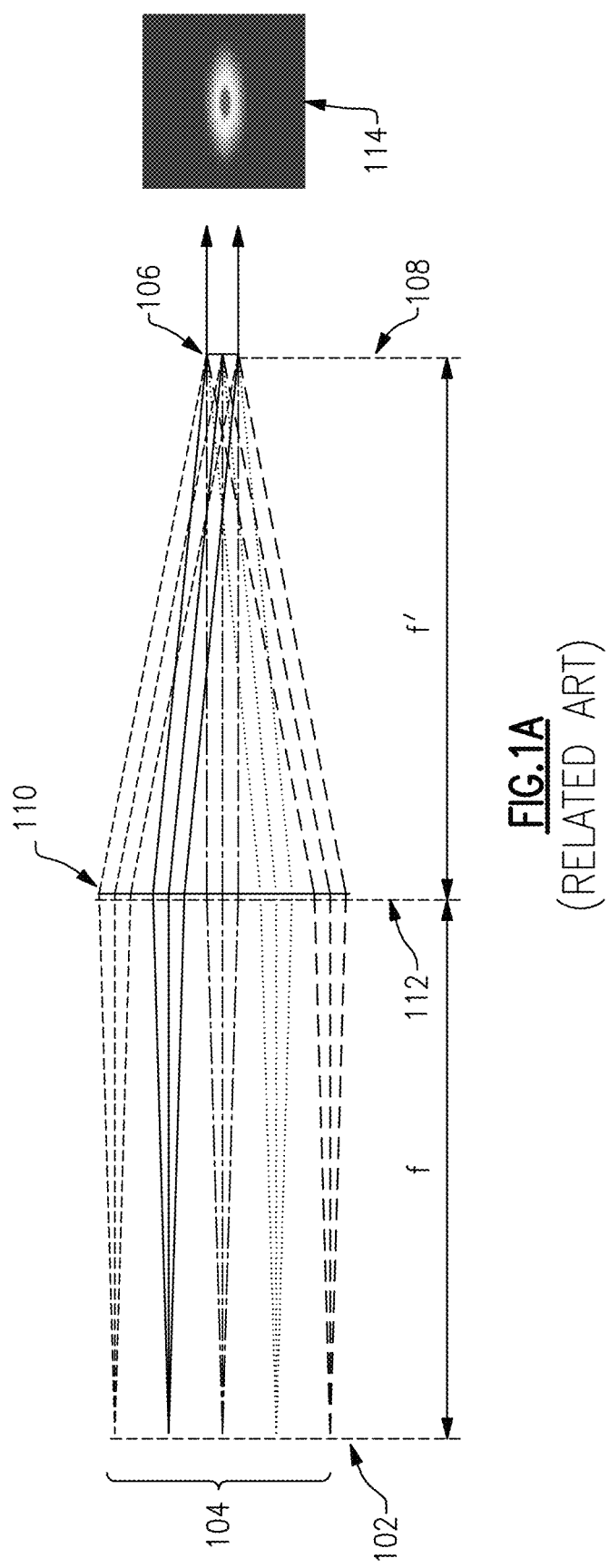
FIG. 1A is a diagram showing a side view (dispersion axis) of one example of a conventional spectral beam combining system.
Figure 1B:
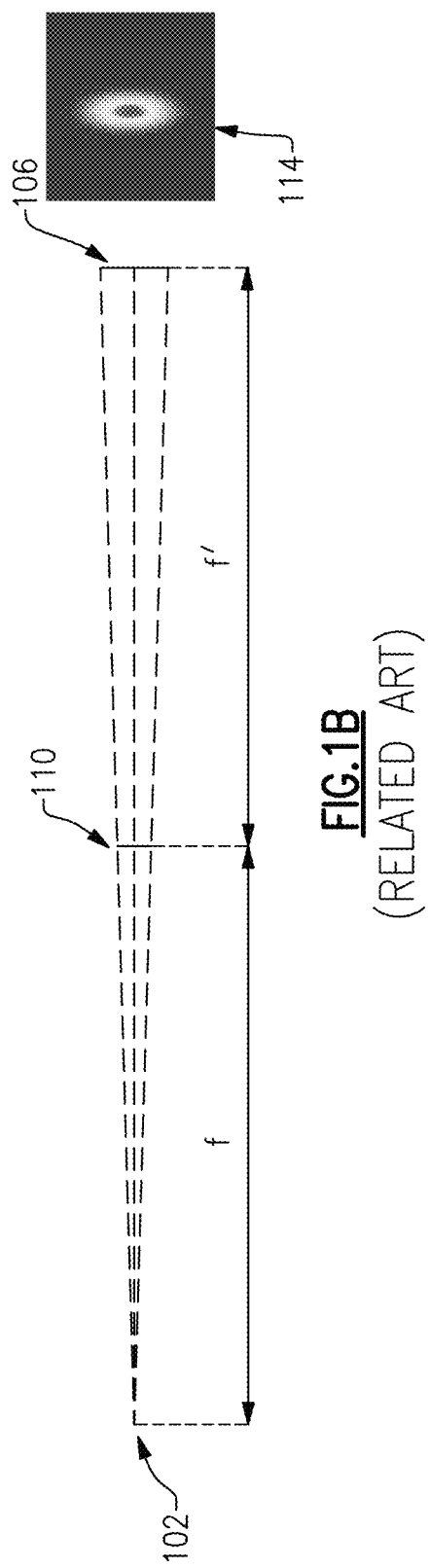
FIG. 1B is a corresponding top view (non-dispersion axis) of the conventional spectral beam combining system of FIG. 1A.

Referring to FIG. 5A, as discussed above, the spectral beam combining system 300 includes a plurality of fibers 310 (or other light sources) that produce the individual beams 104, the single-element transform optic 110, and the diffraction grating 106. The individual beams 104 are spectrally combined to form the combined output beam 114. As discussed above, the combined beam 114 output from the diffraction grating may have an elliptical profile, as shown in FIGS. 1A and 1B. Accordingly, the system 300 may include aft optics 320 that receive the output beam 114 from the diffraction grating 106 and reformat the output beam to have a more circular profile, as shown in FIG. 5A. In the illustrated example, the aft optics 320 includes four mirrors 322, 324, 326, and 328; however, in other examples that aft optics 320 may include any number of mirrors and/or lenses that are configured to condition the output beam 114 as desired (for example, but not necessarily to reformat the shape of the beam) and to direct the output beam 114 to a desired location. In many instances, it may be necessary (e.g., due to packaging constraints) or desirable to maintain the optics of the spectral beam combining system 300 within a relatively small volume. However, as discussed above, a conventional spectral beam combining system, such as system 300, that uses the single-element transform optic 110 may have a long effective focal length due limitations on the parameters of Equation (1), and therefore a long physical optical path length. With only a single transform optic, the effective focal length and the optical path length are the same. Accordingly, As shown in FIG. 5A, due to this long effective focal length, a plurality of fold mirrors are required to bend the optical path to within a desired packaging volume. In the example shown in FIG. 5A, there are six fold mirrors 331, 332, 333, 334, 335, and 336. These fold mirrors 331, 332, 333, 334, 335, and 336 may add significant cost, weight and complexity (e.g., due to the need to align a multitude of mirrors) to the system 300. In contrast, embodiments of a spectral beam combining system using a multi-element transform optic 210 as disclosed herein may achieve a significantly shorter physical optical path length while maintaining the same long effective focal length, as discussed above, and thus reduce or entirely avoid the need for fold mirrors in the optical path.

For example, referring to FIG. 5B, there is illustrated an example of a spectral beam combining system 400 that is functionally equivalent to the conventional system 300 shown in FIG. 5A, but which uses an embodiment of the multi-element transform optic 210 disclosed herein, and as a result, does not include any fold mirrors in the optical path between the fibers 310 and the diffraction grating 220. In the example shown in FIG. 5B, the system 400 includes the transform optic 210, which is made up of the first optical element 212, the second optical element 214, and the third optical element 216, as discussed above, where the first, second, and third optical elements 212, 214, 216 have a PNP (telephoto) optical power arrangement in the dispersion axis. The system 400 is shown with the same aft optics 320 as in the system 300 of FIG. 5A for a relative size comparison. Those skilled in the art will appreciate, given the benefit of this disclosure, that other examples of the system 400 may be constructed with any optical arrangement of aft optics, not limited to the example shown in FIG. 5B. As may be seen by comparing FIGS. 5A and 5B, the system 400 of FIG. 5B is significantly more compact that the conventional system 300 of FIG. 5A, and also avoids the cost, weight, and complexity associated with the fold mirrors 331, 332, 333, 334, 335, and 336 of the system 300.

As discussed above, in certain embodiments, the first, second, and third optical elements 212, 214, 216 of the transform optic 210 are cylindrical lenses (i.e., having optical power only in the dispersion axis). In similar examples, the first, second, and third optical elements 212, 214, 216 of the transform optic 210 can be mirrors that have a cylindrical surface figure, such that they provide optical power only in the dispersion axis. In other examples, however, the first, second, and third optical elements 212, 214, 216 of the transform optic 210 can be toroids. Toroids are lenses or mirrors that have different optical power in the dispersion axis and the non-dispersion axis. Cylindrical optical elements are a special case of toroids in which the optical power in the non-dispersion axis is zero (or essentially zero).

In certain examples, due to the shortened optical path length between the fibers and the diffraction grating achieved through the use of the multi-element transform optic 210, the beams do not diverge as much in the non-dispersion axis as they do in conventional spectral beam combining systems, which results in higher beam intensity at the diffraction grating 220. In certain instances, it may be desirable to limit or decrease the beam intensity at the diffraction grating 220 because if the beam intensity is too high (e.g., >100 Watts) the diffraction grating 220 may be damaged. Similarly, excessive beam intensity at any other optical element in the system can also result in the optical element being damaged. The goal of spectral beam combining is to produce the output beam 114 having high power, but not necessarily high intensity, which may be achieved by aligning the power in each individual beam 104 in the same direction. Accordingly, toroidal optical elements may be used to increase the beam divergence in the non-dispersion axis, and thereby lower the beam intensity.

FIGS. 6A and 6B illustrate an example of a spectral beam combining system 500 in which the transform optic 210 includes one or more toroids. FIG. 6A shows a side view (dispersion axis) and FIG. 6B shows a top view (non-dispersion axis) of the system 500. In one example, the third optical element 216 of the transform optic 210 can be toroidal with negative optical power in the non-dispersion axis. In another example, the second optical element 214 and the third optical element 216 can both be toroids, with the second optical element 214 having negative optical power in the non-dispersion axis and the third optical element 216 having positive optical power in the non-dispersion axis to provide a wider but collimated output beam. As discussed above, the first, second, and third optical elements 212, 214, and 216 of the transform optic 210 can be lenses or mirrors. Table 1 below provides examples of configurations for the transform optic 210 using one or more toroids. As shown, toroids may be used for second and/or third optical elements in the transform optic 210.

TABLE 1

| Optical Element | Optical Power in Dispersion Axis | Optical Power in Non-Dispersion Axis |
| --- | --- | --- |
| First optical element 212 | Positive (P) | None |
| Second optical element 214 | Negative (N) | Negative (N) or none |
| Third optical element 216 | Positive (P) | Positive (P) or none |

As discussed above, spectral beam combining systems 200, 400, 500 can be made very compact relative to conventional spectral beam combining systems with similar specifications that use a conventional single-element transform optic. However, there may be some practical limitations to the degree of compactness that can be achieved while maintaining adequate performance. For example, making the system 200 too compact may result in the mirror radii of curvature being too small, which increases aberrations tolerance sensitivity. For example, when the first mirror 242 and the second mirror 244 approach f/2, aberrations may begin to increase past the diffraction limit for a typical fiber numerical aperture.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, vertical and horizontal, and cartesian coordinates x, y, z are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. A multi-element transform optic for a spectral beam combining system comprising:
    a first optical element, the first optical element being a cylindrical optical element having positive optical power in a first axis;
    a second optical element, the second optical element having negative optical power in the first axis; and
    a third optical element, the third optical element being a toroid having positive optical power in the first axis and either positive or negative optical power in a second axis that is orthogonal to the first axis, the first and third optical elements being positioned on opposite sides of the second optical element and equidistant from the second optical element,
    wherein the multi-element transform optic has an optical path length extending between a front focal plane and a back focal plane that is shorter than an effective focal length of the multi-element transform optic, the first optical element being positioned between the front focal plane and the second optical element, and the third optical element being positioned between the second optical element and the back focal plane.

2. The multi-element transform optic of claim 1 wherein the second optical element is a cylindrical optical element, and wherein the third optical element has negative optical power in the second axis.

3. The multi-element transform optic of claim 1 wherein the second optical element is a toroid having negative optical power in the second axis, and wherein the third optical element has positive optical power in the second axis.

4. The multi-element transform optic of claim 1 wherein the first, second, and third optical elements are mirrors.

5. The multi-element transform optic of claim 4 wherein the first optical element and the third optical element have a same radius of curvature.

6. The multi-element transform optic of claim 1 wherein the first, second, and third optical elements are lenses.

7. The multi-element transform optic of claim 1 wherein a first distance between the front focal plane and the first optical element is equal to a second distance between the third optical element and the back focal plane.

8. The multi-element transform optic of claim 7 wherein a third distance between the first optical element and the second optical element is equal to a fourth distance between the second optical element and the third optical element.

9. A spectral beam combining system comprising:
    a multi-element transform optic including a first optical element having positive optical power in a first axis, a second optical element having negative optical power in the first axis, and a third optical element having positive optical power in the first axis, the second optical element being positioned between the first and third optical elements along the first axis;
    a diffraction grating positioned at a back focal plane of the multi-element transform optic; and
    a plurality of optical fibers positioned at a front focal plane of the multi-element transform optic and configured to generate a corresponding plurality of individual optical beams, the multi-element transform optic and the diffraction grating in combination being configured to spectrally overlap the plurality of individual optical beams to form a combined output beam, the first axis corresponding to a dispersion axis of the plurality of optical fibers, wherein an effective focal length of the multi-element transform optic is longer than an optical path length of the multi-element transform optic that extends from the front focal plane to the back focal plane.

10. The spectral beam combining system of claim 9 wherein the plurality of optical fibers are fiber lasers.

11. The spectral beam combining system of claim 9 wherein the first, second, and third optical elements are mirrors.

12. The spectral beam combining system of claim 11 wherein the first and third optical elements have a same radius of curvature.

13. The spectral beam combining system of claim 9 wherein the first, second, and third optical elements are lenses.

14. The spectral beam combining system of claim 9 wherein the first and second optical elements are cylindrical optical elements, and the third optical element is a toroid having negative optical power in a second axis that is orthogonal to the first axis, the second axis corresponding to a non-dispersion axis of the plurality of optical fibers.

15. The spectral beam combining system of claim 9 wherein the first optical element is a cylindrical optical element, the second optical element is toroid having negative optical power in a second axis that is orthogonal to the first axis, and the third optical element is a toroid having positive optical power in the second axis, the second axis corresponding to a non-dispersion axis of the plurality of optical fibers.

16. The spectral beam combining system of claim 9 wherein the second optical element is equidistant from the front and back focal planes along the first axis.

17. The spectral beam combining system of claim 16 wherein a first distance between the first optical element and the front focal plane is equal to a second distance between the third optical element and the back focal plane.

18. The spectral beam combining system of claim 9 further comprising aft optics configured to receive the combined output beam from the diffraction grating.

19. The spectral beam combining system of claim 18 wherein the combined output beam received from the diffraction grating has an elliptical beam profile, and wherein the aft optics are configured to reshape the elliptical beam profile into a circular beam profile.

* * * * *